United States Patent [19]
Gaillard

[11] Patent Number: 5,720,908
[45] Date of Patent: Feb. 24, 1998

[54] METHOD OF MANUFACTURING A CYLINDRICAL OPTICAL-FIBER MODULE

[75] Inventor: Pierre Gaillard, Cergy, France

[73] Assignee: Alcatel Cable, Clichy Cedex, France

[21] Appl. No.: 560,643

[22] Filed: Nov. 20, 1995

[30] Foreign Application Priority Data

Nov. 21, 1994 [FR] France ................... 94 13902

[51] Int. Cl.$^6$ .............................. B29D 11/00; G02B 6/44
[52] U.S. Cl. ...................... 264/1.28; 174/72 TR; 174/117 R; 174/117 F; 385/114
[58] Field of Search ........................ 364/1.1, 1.24, 364/1.28, 1.29, 2.7, 339; 174/72 TR, 117 F, 117 FF, 117 A, 117 R; 385/114

[56] References Cited

U.S. PATENT DOCUMENTS

| | | | |
|---|---|---|---|
| 4,709,983 | 12/1987 | Plessner et al. | 385/114 |
| 4,952,020 | 8/1990 | Huber. | |
| 5,342,991 | 8/1994 | Xu et al. | 174/117 F |

FOREIGN PATENT DOCUMENTS

| | | | |
|---|---|---|---|
| 97414 | 1/1984 | European Pat. Off. | 174/117 F |
| 0194891A1 | 9/1986 | European Pat. Off. . | |
| 0 357 139 A3 | 7/1991 | European Pat. Off. . | |
| A-2 319 912 | 2/1977 | France . | |
| A-2 693 560 | 1/1994 | France . | |
| WO9218892 | 10/1992 | WIPO . | |

OTHER PUBLICATIONS

*Patent Abstracts of Japan*, vol. 016,No. 330 (P–1388), Jul. 1992 corresponding to JP-A-04 098210 (Sumitomo Electric Ind Ltd, Others: 01) 30 Mar. 1992.

*Primary Examiner*—Mathieu D. Vargot
*Attorney, Agent, or Firm*—Sughrue, Mion, Zinn, Macpeak & Seas, PLLC

[57] ABSTRACT

The present invention concerns a method of manufacturing an optical-fiber module including a plurality of optical fibers assembled and held together by a flexible resin, said method including a resin-application step in which said flexible resin is applied to the entire set of said fibers which are disposed parallel to one another so that their longitudinal axes lie in substantially the same plane;

wherein said resin-application step is followed by the following steps:
partially cross-linking said resin so as to obtain a ribbon;
rolling up said ribbon by bringing together its longitudinal edges so as to give it a shape that is substantially cylindrical; and
fully cross-linking said resin so as to maintain the cylindrical shape of the rolled-up ribbon.

5 Claims, 2 Drawing Sheets

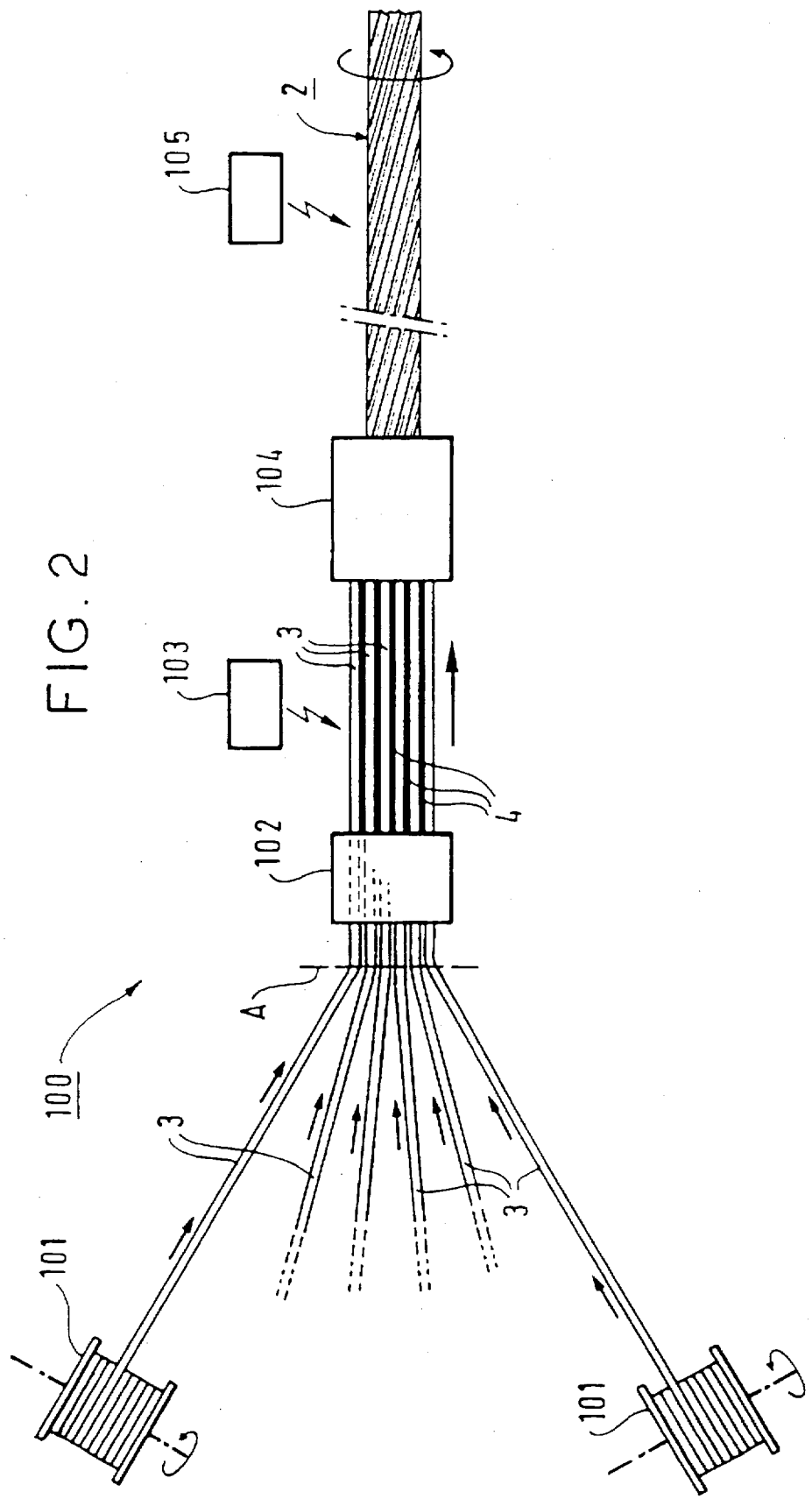

METHOD OF MANUFACTURING A CYLINDRICAL OPTICAL-FIBER MODULE

BACKGROUND OF THE INVENTION

The present invention relates more particularly to a method of manufacturing an optical-fiber module of the type described in Document FR-2 693 560. Such an optical-fiber module is composed of a set of optical fibers assembled and held together by a flexible resin so as to define a ribbon which is rolled up so that its longitudinal edges touch each other. After stripping such a module, a ribbon of optical fibers is available for connection to another ribbon in conventional manner.

Modules of that type are also described in Documents FR-2 319 912 and JP-40/98210.

In order to manufacture such a module, a flexible resin is applied to the fibers which are disposed parallel to one another so that their longitudinal axes lie in substantially the same plane, the resin is then cross-linked, and the ribbon is rolled up by bringing its longitudinal edges together so as to give it a substantially cylindrical shape, the ribbon optionally being rolled up around a central strength member.

That method is not satisfactory.

It is difficult to give the ribbon a cylindrical shape, and especially to maintain such a cylindrical shape, since the cross-linked and therefore set resin opposes both rolling up the ribbon and also maintaining it in a cylindrical shape, and tends to urge the ribbon back to a shape that is plane or relatively plane.

OBJECTS AND SUMMARY OF THE INVENTION

An object of the invention is to remedy that problem by providing a method making it easier to make cylindrical optical-fiber modules of the above-described type.

To this end, the present invention provides a method of manufacturing an optical-fiber module comprising a plurality of optical fibers assembled and held together by a flexible resin, said method including a resin-application step in which said flexible resin is applied to the entire set of said fibers which are disposed parallel to one another so that their longitudinal axes lie in substantially the same plane;

wherein said resin-application step is followed by the following steps:

partially cross-linking said resin so as to obtain a ribbon;

rolling up said ribbon by bringing together its longitudinal edges so as to give it a shape that is substantially cylindrical; and fully cross-linking said resin so as to maintain the cylindrical shape of the rolled-up ribbon.

By sub-dividing cross-linking of the resin into two steps, it is possible both to facilitate the rolling-up operation, since the resin is not fully set during this operation, and is therefore more flexible and easier to roll up, and also to facilitate maintaining the rolled-up ribbon in a properly cylindrical shape in the cable, by finishing setting after the ribbon has been rolled up.

BRIEF DESCRIPTION OF THE DRAWINGS

Other characteristics and advantages of the present invention appear from the following description of a manufacturing method of the invention, given by way of non-limiting example and with reference to the accompanying drawings, in which:

FIG. 2 is a very diagrammatic view of apparatus making it possible to manufacture the optical-fiber module shown in FIG. 1B by implementing the method of the invention.

MORE DETAILED DESCRIPTION

In all of the figures, common elements are given like references.

Figure 1A:
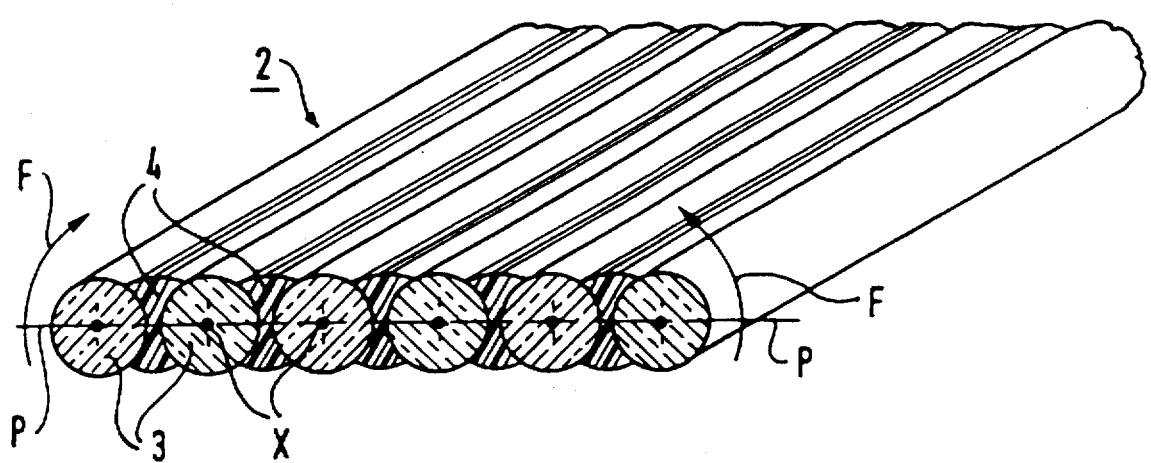
FIG. 1A is a perspective view of an optical-fiber module in the unrolled state.

FIG. 1A shows an optical-fiber module 2 in the unrolled state comprising a plurality (six in the example shown) of optical fibers 3 assembled and held together by means of a flexible resin 4 (e.g. having a modulus of elasticity that is less than 12,000 psi), preferably having a coefficient of thermal expansion in the vicinity of that of the optical fibers 3.

More precisely, in the unrolled module 2, all of the optical fibers 3 are disposed parallel to one another with their longitudinal axes X all lying in substantially the same plane which is referenced P in FIG. 1A.

Figure 1B:
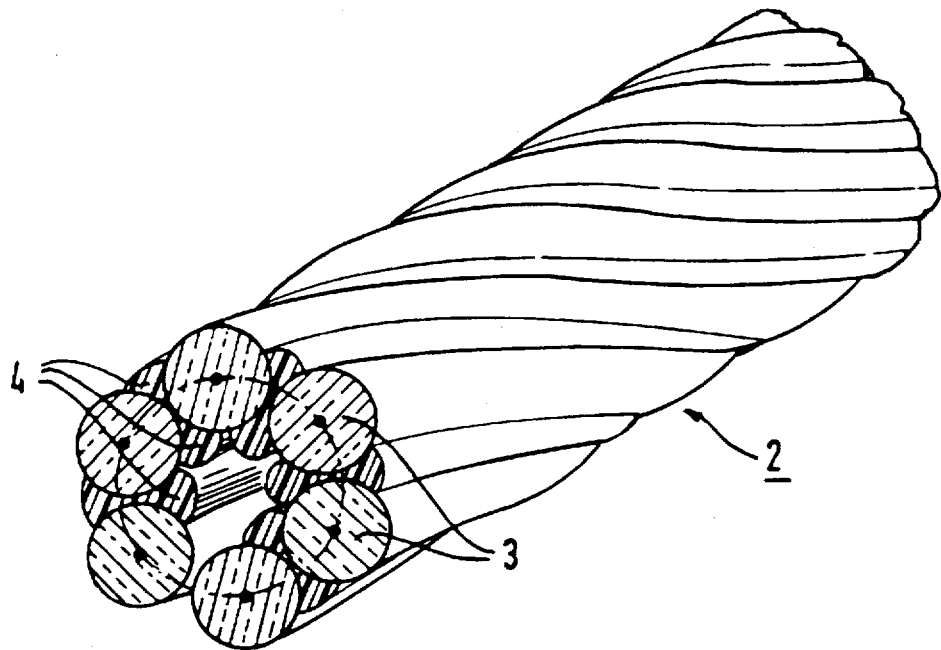
FIG. 1B is a perspective view of an optical-fiber module in the rolled-up state.

FIG. 1B shows the module 2 in the rolled-up state, obtained by rolling up the module shown in FIG. 1A by bringing its longitudinal edges together as indicated by arrows F. In this way, a module 2 that is substantially cylindrical in shape is obtained.

The module 2 may be rolled-up longitudinally, i.e. so that its optical fibers 3 remain parallel to one another and to a common central axis, or else the rolled-up module may be twisted helically about its longitudinal axis, as shown in FIG. 1B. This offers the advantage of making the module 2 more flexible and more resistant to bending. Furthermore, such a helically-twisted rolled-up module retains its cylindrical shape better than a longitudinally rolled-up module.

FIG. 2 is a very diagrammatic view of apparatus 100 making it possible to manufacture the module 2 shown in FIG. 1B, according to the invention.

The apparatus 100 includes a plurality of reels 101 (only two of them are shown in FIG. 2 for reasons of clarity) for storing and paying out the optical fibers 3 independently from one another. The optical fibers 3 are brought together so that they are parallel to one another and so that they lie substantially the same plane P at a section A of the apparatus 100. They then pass through a coating die 102 enabling them to be coated with the resin 4 in the non cross-linked state.

All of the coated fibers 3 are then exposed to ultraviolet radiation so as to cross-link the resin 4 partially by means of a cross-linking oven 103, so that the resin 4 retains a certain amount of flexibility while already holding the optical fibers 3 together.

The resulting ribbon then passes through apparatus 104 for rolling it up and helically twisting it about its longitudinal axis so as to obtain a substantially cylindrical shape. It then goes past another oven 105 that is identical to oven 103 and that fully cross-links the resin 4, also by means of ultraviolet radiation, so as to maintain the cylindrical shape of the module 2.

By performing cross-linking in two steps, respectively before and after the rolling-up and twisting operation, the rolling-up and twisting operation is made easier, and the strength of the module 2 in the rolled-up state is improved.

The resulting module 2 may then be used in any type of optical cable.

Naturally, the present invention is not limited to the above-described implementation.

The resin 4 in the non cross-linked state may be applied asymmetrically relative to the plan P.

The method of the invention enables modules to be made that optionally include central support members.

The ribbon 2 may be helically twisted around a holding tool that is removed once twisting is finished. For example, twisting may be performed by means of a rotating ribbon-receiving reel.

The resin used may be of any known type, provided that it is relatively flexible.

The manufacturing apparatus shown may be installed vertically or horizontally.

Finally, any means may be replaced with equivalent means without going beyond the ambit of the present invention.

I claim:

1. A method of manufacturing an optical-fiber module comprising a plurality of optical fibers assembled and held together by a flexible resin, said method including a resin-application step in which said flexible resin is applied to the entire set of said fibers which are disposed parallel to one another so that their longitudinal axes lie in substantially the same plane; wherein said resin-application step is followed by the following steps:

partially cross-linking said resin so as to obtain a ribbon;

rolling up said ribbon by bringing together its longitudinal edges so as to give it a shape that is substantially cylindrical; and fully cross-linking said resin so as to maintain the cylindrical shape of the rolled-up ribbon.

2. A method according to claim 1, wherein said resin-application step is performed asymmetrically relative to said plane.

3. A method according to claim 1, wherein said ribbon in the rolled-up state is twisted helically about its longitudinal axis.

4. A method according to claim 1, wherein said ribbon is rolled up around a central support member.

5. A method according to claim 1, wherein said resin has a modulus of elasticity that is less than 12,000 psi and a coefficient of thermal expansion that is in the vicinity of that of said optical fibers.

* * * * *